United States Patent [19]

Pickering et al.

[11] Patent Number: 5,491,644
[45] Date of Patent: Feb. 13, 1996

[54] CELL ENGINEERING TOOL AND METHODS

[75] Inventors: Leslie W. Pickering, Atlanta; Eric N. Barnhart, Lawrenceville; Bruce A. Harvey, Norcross; Michael L. Witten, Decatur, all of Ga.

[73] Assignee: Georgia Tech Research Corporation, Atlanta, Ga.

[21] Appl. No.: 116,887

[22] Filed: Sep. 7, 1993

[51] Int. Cl.[6] .................................................. H05G 1/26
[52] U.S. Cl. ............................... 364/514 R; 340/854.6; 340/854.3; 340/854.5; 379/59; 455/67.6; 455/67.4
[58] Field of Search ............................. 364/514; 379/58, 379/59, 60; 340/854.6, 854.3, 855.5; 370/95, 80; 395/21, 50, 409, 919; 455/67.6, 67.4

[56] References Cited

U.S. PATENT DOCUMENTS

| | | | |
|---|---|---|---|
| 4,648,124 | 3/1987 | Mantovani et al. | 455/67.4 |
| 4,747,101 | 5/1988 | Akaiwa et al. | 379/59 OR |
| 5,276,277 | 1/1994 | Hightower et al. | 174/35 R |

*Primary Examiner*—Emanuel T. Voeltz
*Assistant Examiner*—Kamini S. Shah

*Attorney, Agent, or Firm*—Hopkins & Thomas; Scott A. Horstemeyer

[57] ABSTRACT

A cell engineering tool (10) evaluates wireless communications channels within and around architectural structures, such as buildings, in order to determine communications transfer characteristics, including the RMS signal power level and the complex-valued frequency-domain transfer function H(f) of the communications channel. In architecture, the CET (10) comprises a user interface (12) and an analysis engine (14) communicating with the user interface (12). The analysis engine (14) has a plurality of propagation models (16), which may be run concurrently for validation, if desired. Using the user interface (12), which is preferably a graphics mechanism, the user (18) inputs a floor plan, wall material parameters (conductivity, permittivity), and the location of a transmitter (53) and receiver (54) within the floor plan. The analysis engine (14) analyzes the input parameters and uses one or more of the propagation models (16) in order to derive a CET output. The propagation models (16) include an analytical model (26), a ray tracing model (27), and a statistical model (28). The analytical model (26) and the ray tracing model (27) are utilized to derive the transfer function H(f) and their respective results can be compared with each other for validation. Further, the statistical model (28) may be used to generate a rapid approximation of the RMS signal power loss or level.

2 Claims, 11 Drawing Sheets

CELL ENGINEERING TOOL AND METHODS

FIELD OF THE INVENTION

The present invention generally relates to the design and deployment of wireless communication networks within and around architectural structures, for example, buildings and, more particularly, to a novel cell engineering tool and associated methods for determining wireless communications transfer characteristics between selectable locations within and around architectural structures.

BACKGROUND OF THE INVENTION

Wireless communications systems, such as cellular communications systems, are increasingly being designed and deployed in and around buildings and other architectural structures. Walls and other barriers within these architectural structures affect the ability to communicate using electromagnetic waves. In other words, electromagnetic waves may be partially or fully reflected or absorbed by a wall which may thereby inhibit transfer of information between two locations in the structure. Typically, in cellular systems, a number of base stations are distributed throughout the structure to facilitate wireless communications. The structure is divided up into regions, called cells, and generally, a base station is allocated to each cell. Hence, when a transmitter communicates with a receiver in the structure, both the transmitter and receiver communicate directly to the nearest base station.

In order to determine where base stations should be located within the structure, a signal power level meter is usually carried throughout the building and actual signal power level measurements are taken between specified locations throughout the structure. Typically, cellular communications systems are over-engineered to include more cells and base stations than are necessary so as to ensure adequate wireless communications uniformly throughout the structure. It is currently estimated that over-engineering wastes approximately $10,000 to $500,000 per cellular installation. Accordingly, it would be extremely desirable to determine wireless communications transfer characteristics between selectable locations in structures, prior to installation of cellular communications systems.

It is generally known in the art that, prior to installation of a cellular communications system, a ray tracing method may be utilized for determining a transfer function H(f) which characterizes the wireless communications channel between a transmitter location and a receiver location in a structure. The transfer function H(f) is a mathematical complex-valued function in the frequency domain, which provides the frequency domain characterization of the radio propagation channel in much the same manner that a filter is characterized by its transfer function. The transfer function H(f) provides the only complete characterization of the communications channel between two points and, as such, is of unique value relative to communication performance assessment and simulation.

The ray tracing method is a brute force method of propagation analysis with a long history. It has been used in a variety of forms for the tracing of rays in ionospheric propagation, tropospheric propagation, and in the analysis of numerous other physical propagation channels. Until the advent of powerful computers that characterized the 1990s, however, the major drawback to ray tracing has always been the limitations of computer power and computation time. Currently, there has been a resurgence of interest in ray tracing, especially in the art of computer graphics.

The ray tracing method involves searching for communications channels between a transmitter location and a receiver location. In general, rays are graphically projected in all directions from the transmitter location in an artificially created computer space, tracing each ray as it encounters walls and other obstacles, while applying the wall properties (reflection and transmission coefficients) to the transmitted and reflected rays, and finally determining if the ray passes close enough to the receiver to be counted as a ray that is supported by the communications channel. The majority of the rays are usually discarded.

Although the ray tracing method can be used to accurately determine wireless communications transfer characteristics, this method requires numerous and complex computations, which get more pronounced as room geometries get more complicated and the number of rooms increases. Furthermore, the requisite numerous computations result in slow operation and the inability to construct a portable real-time tool for determining wireless communications transfer characteristics. Finally, there is no way of checking, or validating, results which are generated by using the ray tracing method.

SUMMARY OF THE INVENTION

An object of the present invention is to overcome the deficiencies of the prior art as noted above and as generally known in the industry.

Another object of the present invention is to provide systems and methods for accurately and quickly determining wireless communications transfer characteristics between selectable locations within and around architectural structures.

Another object of the present invention is to provide systems and methods for minimizing base stations in cellular communications systems within and around architectural structures without adversely affecting wireless communications performance.

Another object of the present invention is to provide systems and methods for optimizing the performance of base stations in cellular communications systems within and around architectural structures.

Another object of the present invention is to provide systems and methods for validating the derivations of wireless communications transfer characteristics, including the transfer function H(f), between selectable locations within and around architectural structures.

Another object of the present invention is to provide a portable cell engineering tool (CET) for computing a signal power level and/or loss between selectable locations within and around architectural structures.

Briefly described, the present invention is a cell engineering tool for evaluating wireless communications channels within and around architectural structures, such as buildings, in order to determine communications transfer characteristics, including the RMS signal power level and the complex-valued frequency-domain transfer function H(f) of the communications channel. In architecture, the CET comprises a user interface and an analysis engine communicating with the user interface. The analysis engine has a plurality of propagation models, which may be run concurrently for validation, or cross-checking, if desired. Using the user interface, which is preferably a graphics mechanism, the user inputs a floor plan, wall material parameters (conductivity and permittivity values for each wall), and the location of a transmitter and receiver within the floor plan. The analysis engine analyzes the input parameters and uses one or more of the propagation models in order to derive a CET output. The propagation models comprise a unique overall combination of complementary models, including an analytical model, a ray tracing model, and a statistical model, as well as unique methodologies within these models. The analytical model and the ray tracing model are utilized to derive the transfer function H(f) and their respective results can be compared with each other for validation. Further, the statistical model may be used to generate a rapid approximation of the RMS signal power loss or level.

The methodology of the analytical model is novel and can be summerized generally as follows. A floor plan, a transmitter location and a receiver location within the floor plan, and respective relative permittivity and conductivity values of walls within the floor plan are all initially specified by the user and inputted into the CET. Next, in accordance with the analytical model, a transfer function is determined for a communications channel between the transmitter and receiver location by mathematically combining with a mathematical formula the transmitter location, the receiver location, the relative permittivity values, and the conductivity values. The mathematical formula of the analytical model permits direct, easy, fast, and accurate calculation of the transfer function H(f), unlike any other methodology proposed in the prior art which invariably involve time-consuming trial-and-error experimentation and numerical algorithms.

The methodology of the statistical model is also novel and can be summerized generally as follows. A lookup table is generated off-line for implementing this methodology. The lookup table comprises propagation laws {A, n}, each having a coefficient A and an exponent n, which are cross-referenced with descriptors having a respective floor plan, a respective transmitter location and a respective receiver location within the respective floor plan, and respective relative permittivity values and conductivity values of walls within the respective floor plan. Input parameters are specified by the user of the CET. The input parameters include an input floor plan, an input transmitter location and an input receiver location within the input floor plan, and input relative permittivity values and input conductivity values of walls of the input floor plan. A particular propagation law is identified in the lookup table by matching the input parameters with one of the descriptors, the particular propagation law having a particular coefficient A and a particular exponent n. Finally, a signal loss L representative of a wireless communications channel between the input transmitter location and the input receiver location is determined from the combination of the particular coefficient A, the particular exponent n, and a distance r between the input transmitter location and the input receiver location based upon the mathematical expression $L=A/r^n$. A signal power level at the receiver location can be easily computed by subtracting the signal loss L from a signal power level at the transmitter location. Hence, the lookput table and mathematical formula of the statistical model make it possible to generate a rapid approximation of the signal loss L and the RMS signal power level.

The present invention further provides for a methodology for validating the derivations of wireless communications transfer characteristics by the analytical model and the ray tracing model. The analytical model methodology is performed to determine a first transfer function, and the ray tracing model methodology is performed to determine a second transfer function. Then, the first and second transfer functions are compared to check the functions for accuracy. There has never been a validation procedure such as the foregoing in the prior art.

Other objects, features, and advantages of the present invention will become apparent to one of skill in the art upon examination of the following drawings and detailed description.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENT

1. General Overview

Figure 1:
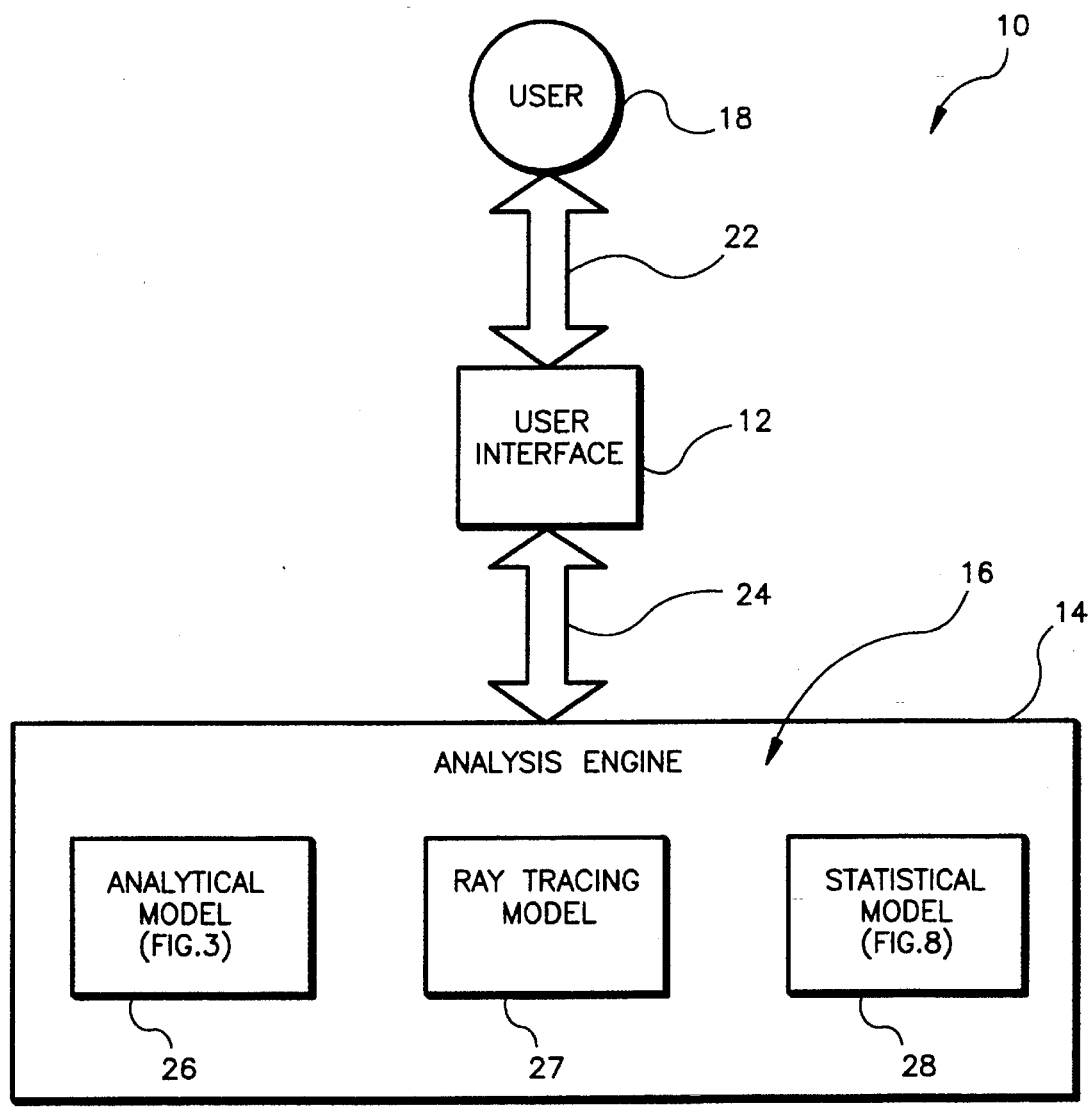
FIG. 1 is a block diagram of the cell engineering tool in accordance with the present invention.

With reference now to the figures wherein like reference numerals designate corresponding parts throughout the several views, a cell engineering tool (CET) 10 in accordance with the present invention is illustrated in FIG. 1. The CET 10 is capable of determining wireless communications transfer characteristics between selectable locations within and around architectural structures, for example, buildings. The CET 10 provides a means of calculating the signal power level and the complete complex-valued transfer function H(f) of any wireless communication channel. These parameters are indispensable for the effective and efficient design of radio communication systems which must function in and around architectural structures. This is especially true as the demand for communications capacity and the number of users increases.

The CET 10 is essentially comprised of a user interface 12, for instance, a graphics mechanism having a display screen with associated software, in communication with an analysis engine 14, for instance, a software routine run by a computer, having a plurality of propagation models 16. The propagation models 16 may include one or more, but preferably all, of the following: an analytical model 26, a ray tracing model 27, and a statistical model 28. The foregoing models 26, 27, 28 can be operated concurrently, if desired, for purposes of validation, as will be further described hereinafter. The user interface 12 receives inputs from a user 18, and by using one or more of the propagation models 16, the CET 10 produces therefrom an output, which is indicative of propagation characteristics, for the user 18 via the user interface 12. The inputs include, for example, a floor plan, a transmitter location within the floor plan, a receiver location within the floor plan, a relative permittivity $\epsilon_r$ for each of the walls in the floor plan, and a conductivity $\sigma$ for each of the walls within the floor plan. A "wall" herein means any substantially planar barrier defining a room space in whole or in part, which can include the floor(s) and/or ceiling(s). Further, the CET output is essentially a communications transfer characteristic of the communications channel between the transmitter location and the receiver location and may be, for example, the signal power level or loss, or a frequency-domain, complex-valued transfer function $H(f)$.

The user interface 12 is preferably AutoCAD, which is a trademark of and is commercially available from Autodesk, Inc, U.S.A. Customized menus can easily be implemented with AutoCAD for allowing the user to input building structures, parameters, and other information into the CET 10. Using the AutoCAD development system (ADS), building layout and other parameters are sent to the analysis engine 14, and all user queries are routed from the analysis engine 14 back to the user interface 12 for presentation to the user 18.

The analysis engine 14 controls processing in the CET 10. The analysis engine 14 receives input data from the user interface 12 and performs initial processing and formatting of the input data. The analysis engine 14 then determines an appropriate propagation model 16 to use, which may be selected by the user 18, and collects data for and invokes the selected propagation model 16. Finally, the analysis engine 14 outputs the results in graphical and/or textual form to the user. In the preferred embodiment, the output to the user is in the form of a color graphics depiction on AutoCAD and/or in the form of an ASCII data file.

The analytical model 26 uses closed-form mathematical expressions for which there is no parallel in the art. A "closed-form mathematical expression" in the context of this document refers to a mathematical formula for directly computing a result without resort to either trial-and-error experimentation or numerical algorithms. Said another way, these closed-form mathematical expressions allow direct mathematical calculation of the transfer function $H(f)$ in a limited number of ideal geometries, for example but not limited to, a corridor having parallel walls of generally unbounded length and a substantially rectangular room.

The ray tracing model 27 is generally the most powerful of the propagation models 16. It can be used to calculate the transfer function $H(f)$ of any arbitrary geometry. It makes use of the method of images, which makes it compatible with the analytical model 26. For those simple geometries in which the analytical model 26 can calculate the transfer function $H(f)$, the ray tracing model 27 can be validated by the analytical model 26. In other words, the analytical model 26 and the ray tracing model 27 can be used together as a cross check. Given that there are a number of ways in which numerical errors can infiltrate ray tracing models 27, this feature is an important capability of the present invention. Furthermore, it should be noted that because the ray tracing model 27 is considerably more algorithmic than the analytical model 26 (in that the ray paths that contribute to the multipath profile must be searched for), the ray tracing model 27 runs much more slowly than the analytical model 26 and speed decreases as room geometries become more complex.

The statistical model 28 is a model which provides for rapid approximate calculations of signal power level between locations. The approximate calculations are still precise enough to be used in system design and base station layout. When using the statistical model 28, the CET 10 does not calculate the complete channel transfer function $H(f)$, but instead focuses on the root mean squared (RMS) value of the power level, which is averaged across the whole frequency range. The RMS value, which is the primary indicator of received signal level, is key to system design and for many designers of indoor wireless networks, is the only parameter utilized.

In the statistical model 28, analytical expressions are derived which are best fits to either experimental data or data derived from the accurate ray tracing model 27. The best fit analytical expressions are situated in a look up table and are cross referenced with particular sets of floor plans, transmitter locations within the floor plans, receiver locations within the floor plans, relative permittivities, and conductivities of the walls in the floor plans. These particular parameters are identified by the analysis engine 14 from the floor plan and specification of the architectural structure inputted into the user interface 12 by the user 18.

Figure 2:
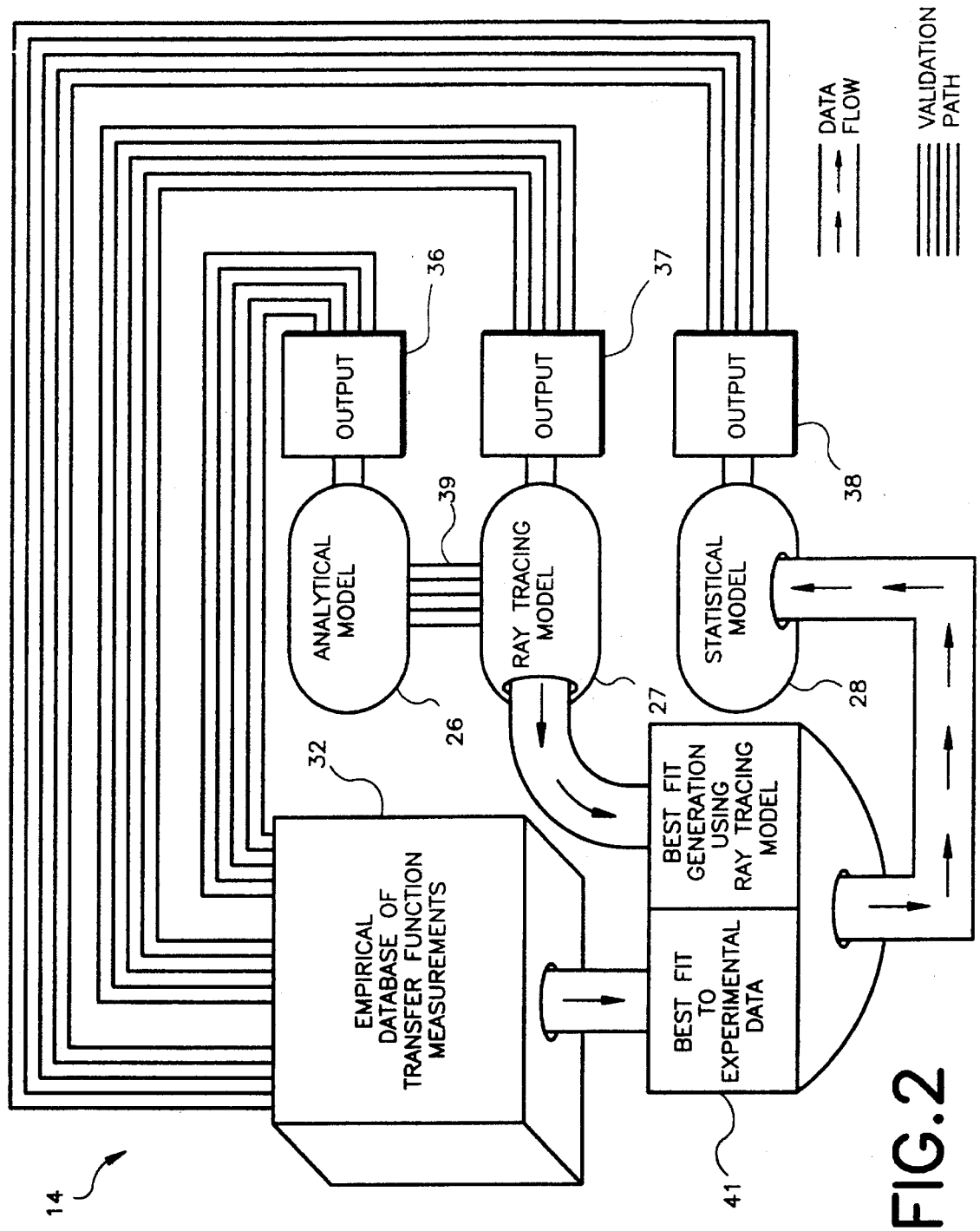
FIG. 2 is a functional block diagram illustrating the interaction of various propagation models of FIG. 1 for achieving validation and accurate results.

FIG. 2 is a high level block diagram illustrating the relationship between the propagation models 16 of the present invention. In FIG. 2, data flow paths are indicated with reference arrows and validation paths are indicated by adjacent parallel lines. As shown in FIG. 2, an empirical data base 32, comprising experimental propagation results, is used in connection with the analytical model 26, the ray tracing model 27, and the statistical model 28 for the purpose of fine tuning the CET 10 and CET output to the user 18. The empirical data base 32 is used for validating one or more of the outputs 36, 37, 38 from the respective models 26, 27, 28. In addition to the important verification task in which the empirical data base 32 can provide to each of the models 26, 27, 28, there is a precise agreement that must exist between the analytical model 26 and the ray tracing model 27. Hence, a validation path 39 is indicated therebetween. This feature provides a much needed capability to calibrate the generally unverifiable ray tracing model 27.

As further shown in FIG. 2, information from the empirical data base 32 is also used to directly feed and construct the statistical model 28. For a number of situations, best fit expressions are derived and incorporated into the statistical model 28. Because of the difficulties and expense in making measurements for the empirical data base 32, there is not enough empirical data to cover the extremely wide variety of situations that might be encountered in an arbitrary architectural structure. For this reason, the ray tracing model 27 is shown in FIG. 2 to feed the statistical model 28 via a best fit mechanism 41. The ray tracing model 27 can be run (off line) for all imaginable situations. Such a procedure is justifiable, of course, only for a validated ray tracing model that is known to provide results which can be accepted with the same degree of confidence as empirical data results.

2. Material Characterization and Reflection Coefficient Calculation

In all of the propagation models 26, 27, 28, the interactions of the electromagnetic waves with respect to the walls of rooms must be included. In the development of the propagation models 16, the following assumptions have been made in the present invention: (1) the electric vector is assumed vertically polarized with respect to the walls, and (2) the analysis is two dimensional in the sense that the interactions of the wave with the ceiling and floor is ignored. The latter case is in accord with the situation which would exist if the antenna patterns had a fan shape, effectively preventing any strong electric fields from impinging on the floors or ceilings.

The usual way to characterize the interactions of electromagnetic waves with walls is through the use of a reflection coefficient(s), which in turn requires a physical characterization of the materials of which the walls are constituted. A physical material is characterized by its relative permittivity $\epsilon_r$ (farads-meter) and its conductivity $\sigma$ (MHOS-meter/meter). These two quantities are combined to form a complex permittivity factor:

$$\epsilon_c = \epsilon_r - j\frac{18\sigma}{f_G} \quad (1)$$

where $f_G$ is the frequency in GHz. Because the variation (measured in GHz) over the frequency bands of interest is such a small fraction of the center frequency, the frequency dependence is not considered in this report and $f_G$ in (1) is replaced with the center frequency of the band of interest.

In analyses of reflection from a surface, extensive use is made of two quantities of primary importance. These are: (1) the angle of incidence, which is the angle between the ray arriving at the reflective surface and the unit normal to that surface, and (2) the plane of incidence, which is the plane containing both the incident and reflected ray.

The reflection coefficient is designated $\rho_c$ for an electric field vector contained in the plane of incidence and is denoted $\rho_p$ for an electric field vector perpendicular to the plane of incidence. It is important to remember that any arbitrary electric field vector can be decomposed into these two electric field vectors. This implies, in turn, because the boundary conditions for the two vector field components can be applied directly, that the electric field reflected from the surface can be determined for any electric field of arbitrary linear polarization. The means by which the reflection coefficient(s) for the individual vector components can be determined is well known and is described in most comprehensive textbooks on electromagnetic theory. The results are presented below.

For an angle of incidence $\theta_i$ and a complex permittivity $\epsilon_c$, the reflection coefficients are given respectively by $$\rho_p = \frac{\cos\theta_i - \sqrt{\epsilon_c - \sin^2\theta_i}}{\cos\theta_i + \sqrt{\epsilon_c - \sin^2\theta_i}} \quad (2)$$

for the "perpendicular to plane of incidence" case and $$\rho_c = \frac{\sqrt{\epsilon_c - \sin^2\theta_i} - \epsilon_c\cos\theta_i}{\sqrt{\epsilon_c - \sin^2\theta_i} + \epsilon_c\cos\theta_i} \quad (3)$$

for the "contained in plane of incidence" case. Because the (vertically polarized) electric field vector is perpendicular to the plane of incidence, the reflection coefficient $\rho_p$ is used herein. This is a consequence of the fact that the propagation model described herein by way of example is two-dimensional. It should be emphasized that these two-dimensional propagation models can be directly enhanced to three dimensions using well known principles in the art. If three dimensional propagation models are desired, then two reflection coefficients, for instance, $\rho_p$, $\rho_c$, would be utilized for identifying the reflection properties of each wall, including the floor(s) and ceiling(s).

3. Analytical Model

The analytical model 26 uses closed-for-mathematical expressions for allowing direct calculation of the channel transfer function directly in a limited number of ideal floor plan geometries. Examples are described hereafter, but it should be noted that these examples are not exhaustive. The examples include a corridor of unbounded length with parallel walls and a rectangular room.

Figure 3:
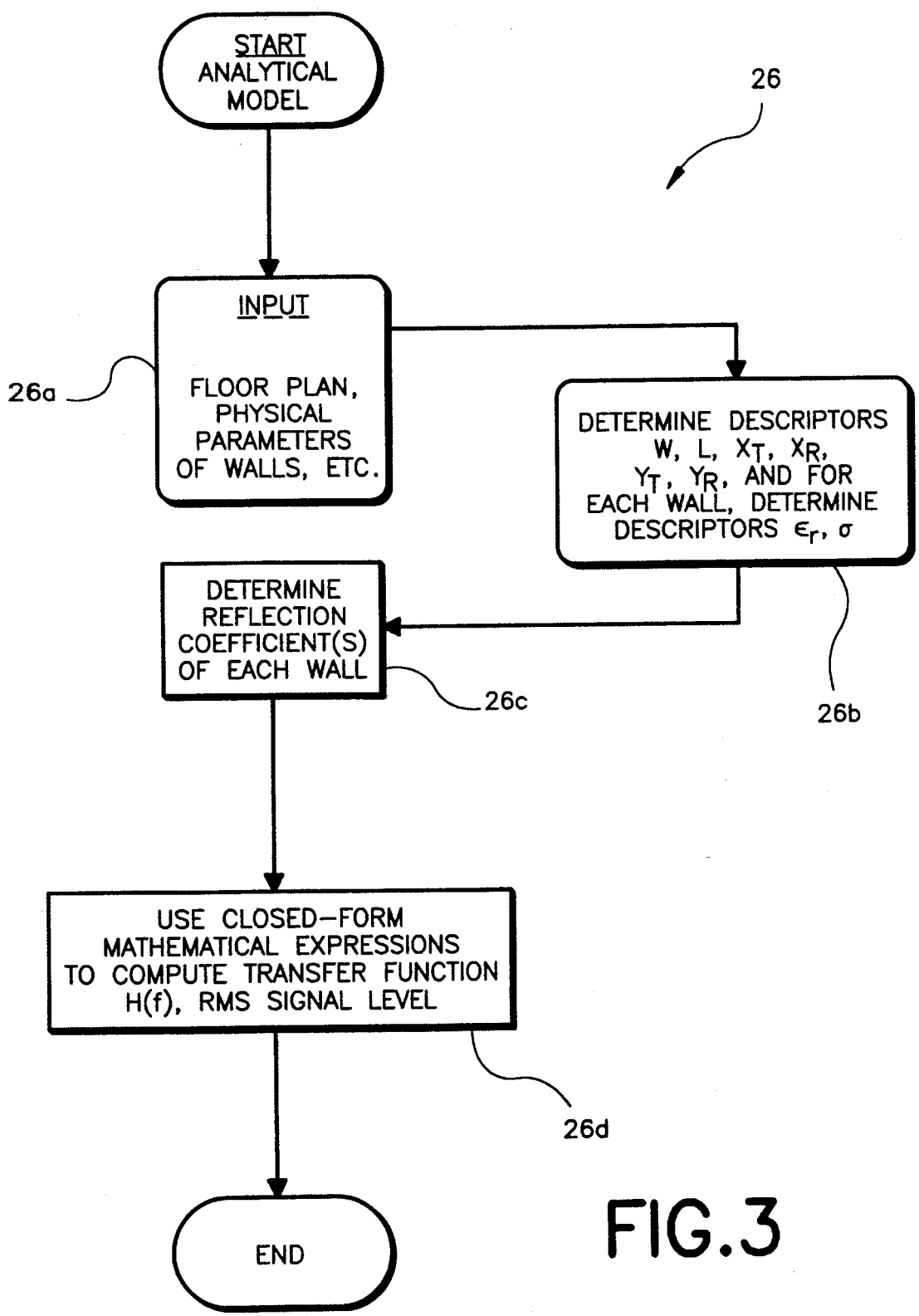
FIG. 3 is a flow chart illustrating the analytical model of FIGS. 1 and 2.

A high level flow chart of the analytical model 26 is shown in FIG. 3. Each of the flow chart blocks represents a software module and/or subroutine in the preferred embodiment. As indicated at a flow chart block 26a, the analytical model 26 first requires input of the following: a floor plan, a transmitter location within the floor plan, a receiver location within the floor plan, a relative permittivity $\epsilon_r$ of the walls in the floor plan, and a conductivity $\sigma$ of the walls within the floor plan. Preferably, these inputs are visually generated on screen by the user 18. From the foregoing inputs, the parameters indicated below in Table A and as indicated in flow chart block 26b are determined:

TABLE A

| INPUT PARAMETERS | |
|---|---|
| Input | Definition |
| W | Width |
| L | Length (for rectangular room) |
| $x_T$ | Distance of transmitter from left wall |
| $x_R$ | Distance of receiver from left wall |
| $y_T$ | y coordinate of transmitter |
| $y_R$ | y coordinate of receiver |
| $\epsilon_r$ | Relative permittivity (farads/meter) |
| $\sigma$ | Conductivity mhos-meter/meter) |

*The y coordinate of any element is just the perpendicular distance to a straight line drawn through the transmitter and all its images. This line, of course, is perpendicular to the wall at y = 0.

Next, the reflection coefficient(s) $\rho_p$ is determined for each of the walls in the floor plan, as indicated in a flow chart block 26c. In the case of a two dimensional propagation model, only a single reflection coefficient need be computed, whereas in the case of a three dimensional propagation model, two reflection coefficients $\rho_p$, $\rho_c$ are calculated for each of the walls. Finally, as shown in flow chart block 26d, closed-form mathematical expressions are used to compute the transfer function H(f) and, if desired, the RMS signal power level.

A. Corridor Model

Figure 4:
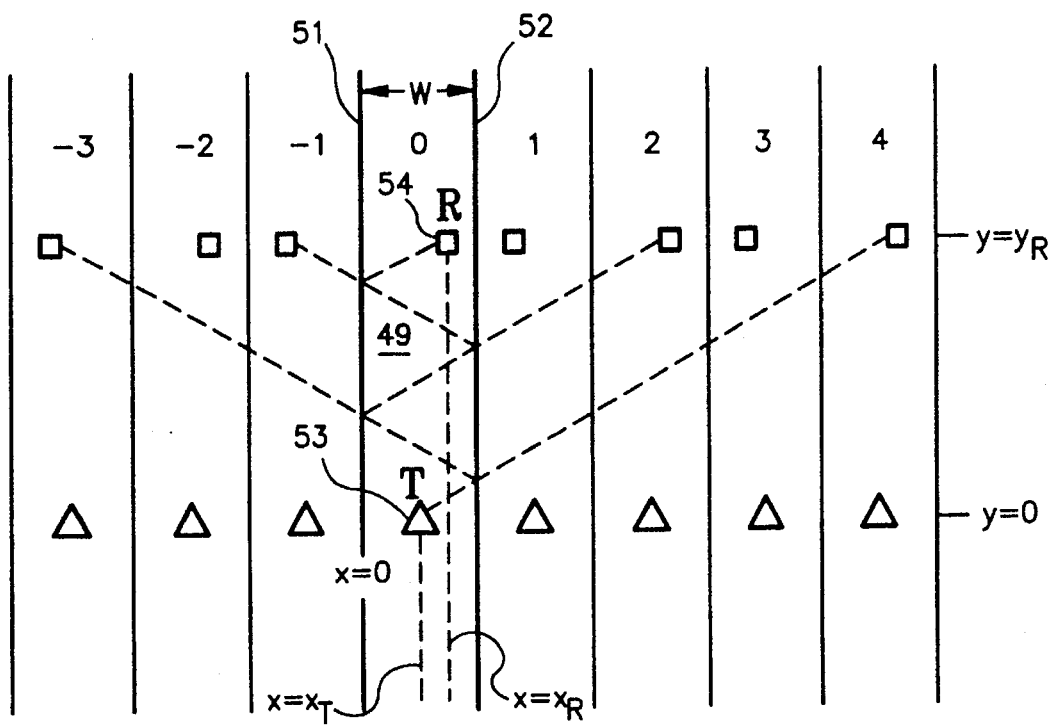
FIG. 4 is a top plan view of a corridor from which a transfer function H(f) is derived using the analytical model of FIG. 3.

The geometry for analysis of a corridor 49 is shown in FIG. 4. The corridor 49 comprises parallel side walls 51, 52 of generally unbounded length. Within the corridor 49, a transmitter location 53 is designated with a small bold triangle and a receiver location 54 is designated with a small bold rectangle. All of the other non-bold rectangles and triangles appearing in FIG. 4 along with accompanying negative or positive integers are images which are used in the analytical development of the ray paths and reflection coefficient(s) $\rho_p$. The foregoing notation is used throughout this document as well as in other figures.

Since the analysis is done in two dimensions based upon the assumptions described previously, a rectangular coordinate system is sufficient and preferred. Thus, each element location in the analysis is specified by values of coordinates x and y, which are specified with respect to the origin of the coordinate system, directly to the left of the transmitter location 53 on the left hand wall of the corridor. This is the x,y=0,0 point. This point can be determined precisely by projecting a line perpendicular to the wall and noting the intersection point. The right hand wall of the corridor corresponds to x=W.

The transfer function H(f) for the propagation channel between the transmitter location 53 and the receiver location 54, is given by $$H(f) = \sum_{n=-\infty}^{n=+\infty} A(n)e^{-j2\pi(f+f_0)\tau(n)} \quad (4)$$

where $f_0$ is the carrier frequency, n is the order of the reflection, $\tau(n)$ is the corresponding delay, and A(n) is the corresponding complex amplitude. The delay is given by $$\tau(n) = \frac{R(n)}{c} \quad (5)$$

where c is the speed of light, and R(n) is the total length of the ray path inside the corridor. This later quantity corresponds to the length of the virtual path from the transmitter location 53 to the nth order image. The propagation distance is given by $$R^2(n) = y_R^2 + [X(n) - x_T]^2 \quad (6)$$

where X(n) is the x coordinate of the nth order image and is given by for $n \geq 1$    $X(O) = x_R$                (7)

$X(n) = (n+1)W - x_R$    n odd $X(n) = nW + x_R$    n even and for $n \leq -1$    $X(n) = -X(-n-1)$        (8)

where the right hand side of this expression is evaluated according to equation (7).

The coefficient A(n), by virtue of the fact that it is affected by the materials of the walls, takes the interactions with the corridor walls into account in a more complex way than the delay.

Two reflection coefficients are defined for the walls, specifically, $\rho_+(n)$ for the right wall of the corridor 49 and $\rho_-(n)$ for the left wall of the corridor 49. In terms of these cases, we have different cases, |n| even and |n| odd. For the case where |n| is even, $$A(n) = \frac{\rho_+^{\frac{|n|}{2}}(n) \rho_-^{\frac{|n|}{2}}(n)}{R(n)} \quad (9)$$

For |n| odd and n>0

$$A(n) = \frac{\rho_+^{\frac{|n|+1}{2}}(n) \rho_-^{\frac{|n|-1}{2}}(n)}{R(n)} \quad (10)$$

If, on the other hand, we have |n| odd and n<0

$$A(n) = \frac{\rho_+^{\frac{|n|-1}{2}}(n) \rho_-^{\frac{|n|+1}{2}}(n)}{R(n)} \quad (11)$$

The reflection coefficient depends on n because the angle of incidence at the wall depends on n. In order to calculate the reflection coefficient, the angle of incidence is required. This is given by $$\theta_i(n) = \tan^{-1}\left[\frac{y_R}{|X(n) - x_T|}\right] \quad (12)$$

where X(n) is given by (7) and (8).

If the corridor walls consist of the same material, the mean-squared signal level (averaged over a specified bandwidth W of interest) can be computed using the closed-form expression $$\overline{|H_L(f)|^2} = \quad (13)$$

$$\sum_{n=-N}^{n+N} \frac{|\rho(n)|^{2|n|}}{R^2(n)} + 2 \sum_{n=-N}^{n=N-1} \sum_{m=n+1}^{m=N} \frac{|\rho(n)|^{|n|}|\rho(m)|^{|m|}}{R(n)R(m)}$$

$$\cos[2\pi f_0 \tau(n,m) + |n|\phi(n) - |m|\phi(m)]\text{sinc}[W\tau(n,m)]$$

where $\Phi(n)$ is the phase of the complex reflection coefficient $\rho(n)$ and the sinc function is defined as $$\text{sinc } x = \frac{\sin \pi x}{\pi x} \quad (14)$$

Note, also, that we have imposed a finite limit on the order of terms to be included in the summation.

Closed-form expressions, like that provided above in equation (13) for the RMS value, have not been derived for the case wherein the walls differ, and would be unduly complicated. The mean squared value can still be computed using a straightforward arithmetic average $$\overline{|H(f)|^2} = \frac{1}{N_f} \sum_{i=1}^{i=N_f} |H(f_i)|^2 \quad (15)$$

where the $N_f$ sequential, equally spaced frequency samples $f_i$ span the bandwidth of interest. This approach, although less elegant and not as fast as the closed-form approach, is general. The interval $\Delta f$ between samples will be commensurate with that used in the experiments. Initially, we choose the value $\Delta f$=8.5 kHz.

The mean path delay $\overline{\tau}$ and multipath spread $\sigma_\tau$ are calculated by using the complex gains of each reflective path to form a weighting factor $$p(n) = \frac{|A(n)|^2}{\sum_{n=-\infty}^{n=+\infty} |A(n)|^2} \quad (16)$$

This expression can be used in the manner of a probability density function to form the averages $$\bar{\tau} = \sum_{n=-\infty}^{n=+\infty} p(n)\tau(n) \quad (17)$$

and $$\sigma_\tau^2 = \sum_{n=-\infty}^{n=+\infty} [\tau(n) - \bar{\tau}]^2 p(n) \quad (18)$$

Hence, the transfer function H(f) for a corridor wall configuration and the corresponding RMS signal level can be calculated with a closed-form mathematical expression without the need to actually experiment on site with a signal power level meter.

B. Rectangular Room Model

Figure 5:
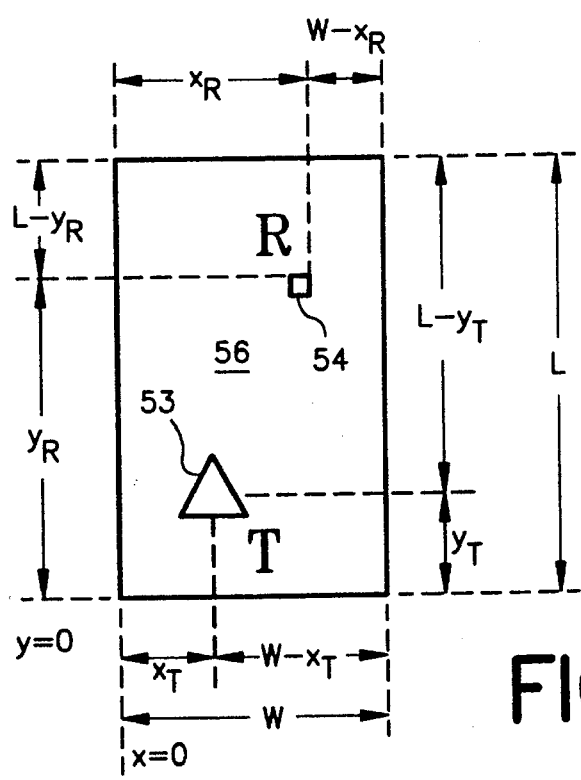
FIG. 5 is a top plan view of a rectangular room from which a transfer function H(f) is derived using the analytical model of FIG. 3.

This section provides the equations and inputs that must be analyzed by the analytical model 33 for the rectangular room model. The geometry for the rectangular room is shown in FIG. 5. The origin for the rectangular coordinate system used to specify the locations of points in the room 56 is preferably at the lower left hand corner of the room 56, as shown in FIG. 5. As in the corridor model, the transmitter location 53 in the room 56 is identified with a triangle and the receiver location 54 is identified with a rectangle.

The parameters which are passed to the subroutine for this model include those parameters listed in Table A. The origin of the rectangular coordinate system coincides with the lower left hand corner of the rectangular room 56. All internal points are measured with respect to this location.

The transfer function H(f) for the propagation channel between the transmitter location 53 and receiver location 54 in the rectangular room 56 is given by $$H(f) = \sum_{n=-N}^{n=+N} \sum_{m=-N}^{m=+N} A(n, m) e^{j2\pi(f+f_0)\tau(n, m)} \quad (19)$$

where $f_o$ is the carrier frequency, A(n,m) is the complex amplitude of each ray path, and $\tau(n,m)$ is the group delay of a signal propagating on that channel. In this expression, equations must be provided for calculation of A(n,m) and $\tau(n,m)$. This is done below.

The delay is given by $$\tau(n, m) = \frac{R(n, m)}{c} \quad (20)$$

where c is the speed of light and R(n,m) is the path length corresponding to the delay. This latter quantity is given by $$R(n, m) = \sqrt{[X(n) - x_T]^2 + [Y(m) - y_T]^2} \quad (21)$$

where X(n) and Y(m) are the coordinates of the image point.
The x coordinate is given by $$X(O) = x_R \quad (22)$$
$$\text{for } n \geq 1 \quad X(n) = (n+1)W - x_R \quad n \text{ odd}$$
$$X(n) = nW + x_R \quad n \text{ even}$$

and $$\text{for } n \leq -1 \quad X(n) = -X(-n-1) \quad (23)$$

The y coordinate Y(m), because of the symmetry of the problem, is given by an analogous expression $$Y(O) = y_R \quad (24)$$
$$\text{for } m \geq 1 \quad Y(m) = (m+1)L - y_R \quad m \text{ odd}$$
$$Y(m) = mL + y_R \quad m \text{ even}$$

and $$\text{for } m \leq -1 \quad Y(m) = -Y(-m-1) \quad (25)$$

The true propagating ray, like the virtual ray that propagates to the receiver image of order (n,m), encounters |n| vertical walls (those bounding the left and right sides of the room and |m| horizontal walls (those bounding the top and bottom of the room). The angle that the ray makes with each vertical wall is given by $$\theta_v(n, m) = \left| \tan^{-1} \frac{|Y(m) - y_T|}{|X(n) - x_T|} \right| \quad (26)$$

and the angle that the ray makes with each horizontal wall is just the complement of this angle, i.e. is given by $$\theta_h(n, m) = \frac{\pi}{2} - \theta_v(n, m) \quad (27)$$

In modeling interactions with the room walls, where each wall may be composed of a different material than the others, it is necessary to define four reflection coefficients, one for each wall of the room. These reflection coefficients are defined below in Table B. The number of times the ray interacts with any particular wall, of course, depends on the location of the receiver image. Hence, this quantity, as well as each of the reflection coefficients, depends on n and m.

TABLE B

REFLECTION COEFFICIENTS FOR WALLS
OF RECTANGULAR ROOM

| Variable | Definition |
| --- | --- |
| $\rho_{v+}$ (n, m) | Reflection coefficient of wall to right |
| $\rho_{v-}$ (n, m) | Reflection coefficient of wall to left |
| $\rho_{h+}$ (n, m) | Reflection coefficient of far (top) wall |
| $\rho_{h-}$ (n, m) | Reflection coefficient of near (bottom) wall |

In terms of these quantities we have $$A(n, m) = \frac{B_v(n, m) B_h(n, m)}{R(n, m)} \quad (28)$$

where the values of the quantities in the numerator are given below $$B_v(n, m) = \rho_{v+}^{\frac{|n|}{2}}(n, m) \rho_{v-}^{\frac{|n|}{2}}(n, m) \quad |n| \text{ even} \quad (29)$$

$$B_v(n, m) = \rho_{v+}^{\frac{|n|+1}{2}}(n, m) \rho_{v-}^{\frac{|n|-1}{2}}(n, m) \quad |n| \text{ odd}, n > 0 \quad (30)$$

$$B_v(n, m) = \rho_{v+}^{\frac{|n|-1}{2}}(n, m) \rho_{v-}^{\frac{|n|+1}{2}}(n, m) \quad |n| \text{ odd}, n < 0 \quad (31)$$

$$B_h(n, m) = \rho_{h+}^{\frac{|m|}{2}}(n, m) \rho_{h-}^{\frac{|m|}{2}}(n, m) \quad |m| \text{ even} \quad (32)$$

$$B_h(n, m) = \rho_{h+}^{\frac{|m|+1}{2}}(n, m) \rho_{h-}^{\frac{|m|-1}{2}}(n, m) \quad |m| \text{ odd}, m > 0 \quad (33)$$

$$B_h(n, m) = \rho_{h+}^{\frac{|m|-1}{2}}(n, m) \rho_{h-}^{\frac{|m|+1}{2}}(n, m) \quad |m| \text{ odd}, m < 0 \quad (34)$$

This completes the specification of all the quantities needed to calculate the complex coefficients in (28).

The mean delay and multipath spread are both determined from the weighting coefficient $$p(n, m) = \frac{|A(n, m)|^2}{\sum_{n=-N}^{n=+N} \sum_{m=-N}^{m=+N} |A(n, m)|^2} \quad (35)$$

From this expression the mean delay $\bar{\tau}$ and multipath spread $\sigma_\tau$ follow immediately.

$$\bar{\tau} = \sum_{n=-N}^{n=+N} \sum_{M=-N}^{m=+N} p(n, m)\tau(n, m) \quad (36)$$

$$\sigma_\tau^2 = \sum_{n=-N}^{n=+N} \sum_{M=-N}^{m=+N} [\tau(n, m) - \bar{\tau}]^2 p(n, m) \quad (37)$$

Hence, the transfer function H(f) and the corresponding RMS signal level can be determined for any rectangular room 56 by using a closed-form mathematical expression without the need to experimentally determine or algorithmically determine the transfer function.

4. Ray Tracing Model

Figure 6:
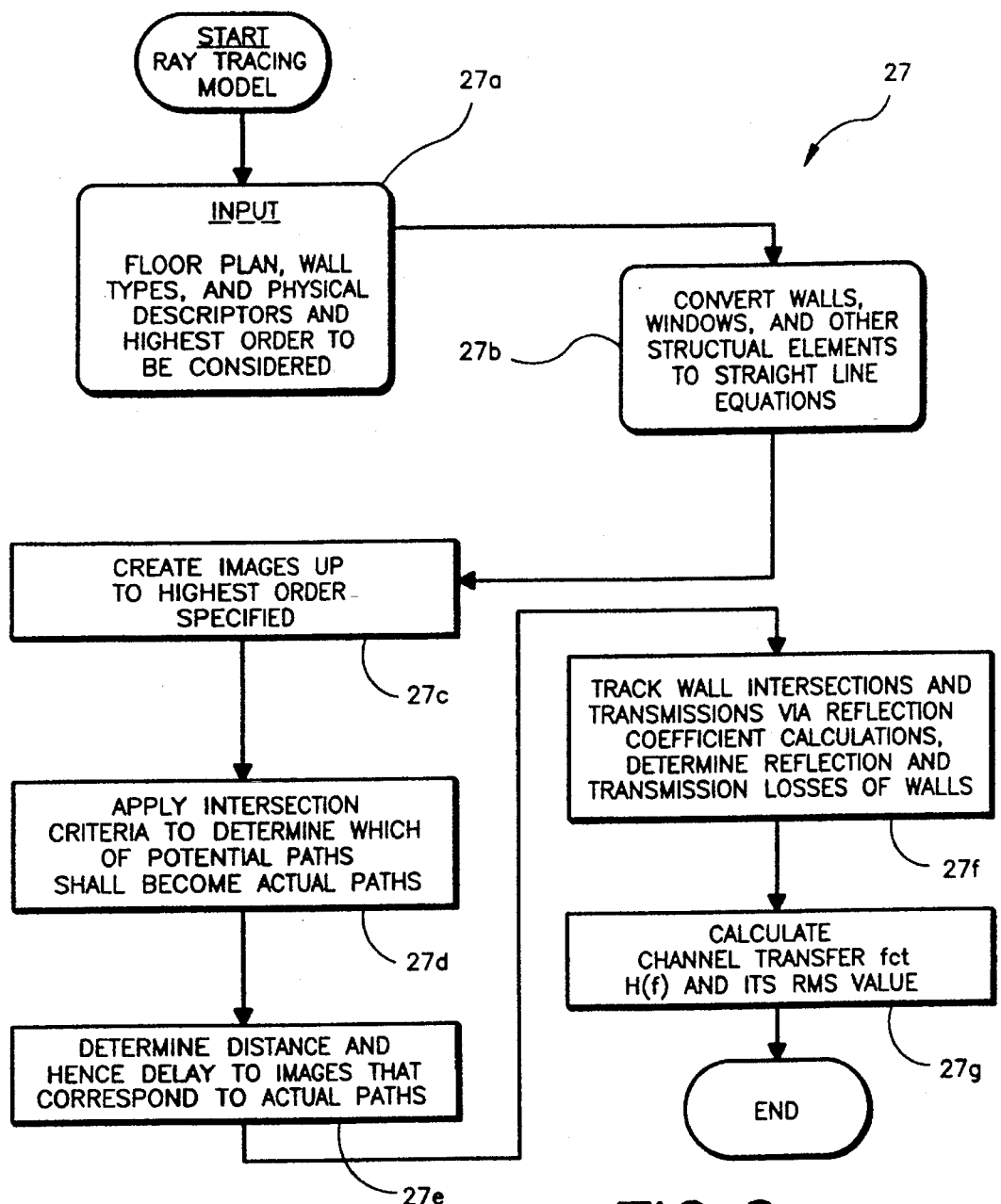
FIG. 6 is a flow chart illustrating the ray tracing model of FIGS. 1 and 2.

This section describes the specifications of the ray tracing model 27. The required inputs and parameters needed to do the ray tracing model 27 are also presented in this section, and a general flow chart of the ray tracing model 27 utilized herein is set forth in FIG. 6.

The ray tracing model 27 is a bruce force method of taking account of all possible ray paths between the transmitter location 53 and receiver location 54. The use of images greatly reduces the computational burden of the ray tracing approach.

The following is a list of definitions for terms used in this discussion.

- wall—A straight line segment corresponding to an actual wall of a room. It extends between the two points representing the ends of the wall.
- extended wall—An infinite straight line, corresponding to and containing a wall. All image reflections are made around extended walls.
- ray—A straight line extending from a source point to a destination point.
- ray segment—A contiguous part of a ray, extending from a source point (that may be the point of reflection or transmission through a wall) to a destination point (location on another physical entity with which the ray must interact).
- image—The mirror reflection about an extended wall of the actual receiver or an image of the receiver.
- order—The order of an image is the number of time the (this is all it says on the draft)
- intersection—The event that takes place when a ray actually encounters a wall. Certain mathematical conditions must pertain in order for an intersection to take place. Usually, we are always interested in the first intersection of a ray emanating from a source point, for it is from this interaction that the properties of the continuing ray are determined. Generally, at each point of intersection the ray is reflected and transmitted.
- wall number—In the discussion below, each wall is numbered. Thus, we encounter references to "extended wall k" and "wall k."
- virtual ray path—A virtual ray path is a mathematical entity that doesn't exist, but is used to calculate actual ray paths. For example, any straight line path from the transmitter to a distant receiver image doesn't really exist.
- actual ray path—This is the path that the ray actually takes in traversing from transmitter to receiver.

These definitions are provided to allow for precise discussion and description of the ray tracing problems. Although it is easier to discuss images in terms of receiver images, in this document, images are formed of the transmitter rather than the receiver since most of the situations to be evaluated involve a single transmitter and many receiver evaluation points. Conceptually, the two approaches are identical.

Figure 7:
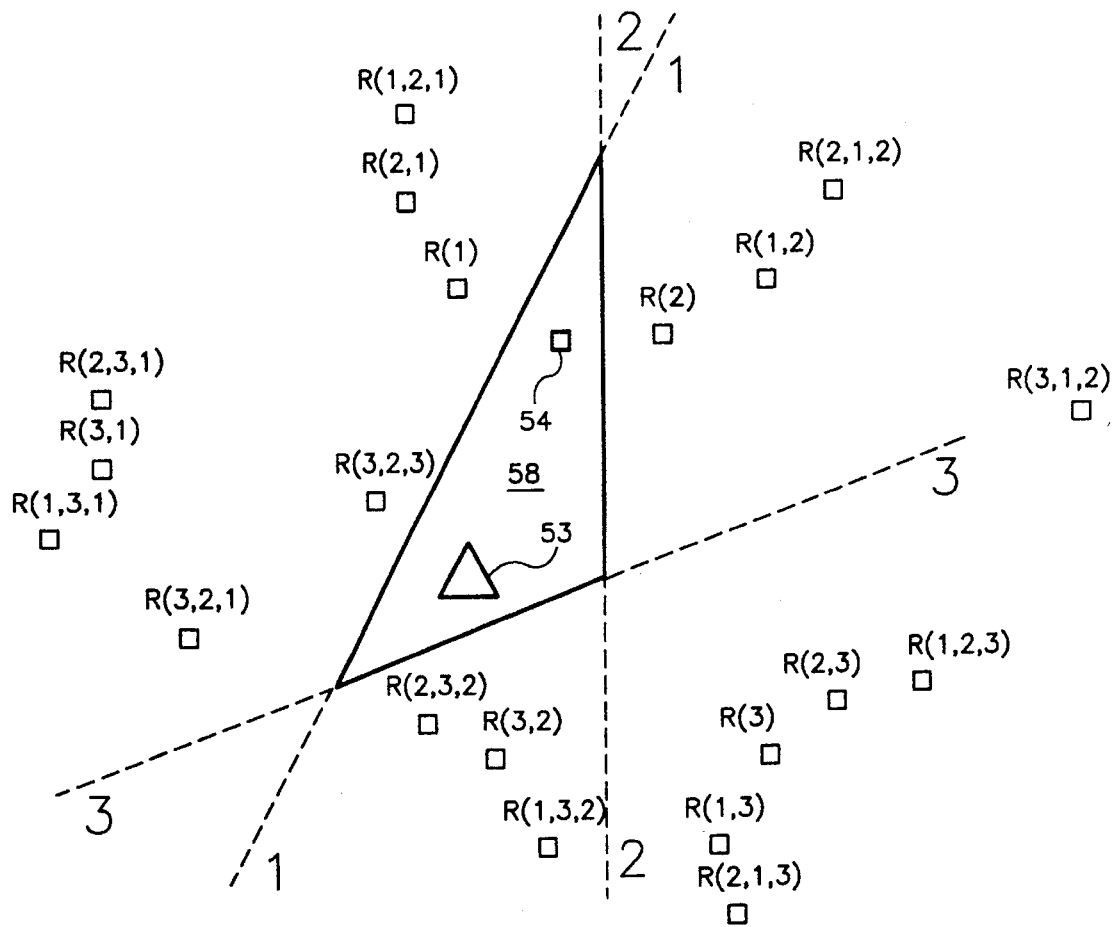
FIG. 7 is a top plan view of a triangular room, used as an example, from which a transfer function H(f) is derived using the ray tracing model of FIGS. 1 and 2.

Images are obtained by determining successive symmetrical reflections of the receiver location 54 or transmitter location 53 about extended walls. To simplify notation and discussion it is helpful to number the walls sequentially. Then, for example, the first order image of the receiver location 54 about the wall 3 is just the mirror image of the receiver about that wall and is denoted R(3). The second order reflections R(3,4) and R(3,8) are the mirror images of R(3) about wall 4 and wall 8 respectively. FIG. 7 illustrates all the reflections up to third order in a triangular configuration 58 of three walls.

Generally, the number of images of order n is given by $$N(n,w) = w(w-1)^{n-1} \quad (38)$$

where w is the number of walls. It can be argued very simply (and will become clear later) that the number of potential multipath rays (exclusive of the direct path) is equivalent to the number of images created in any image generation process. Thus, if all images up to order n are generated, the number of corresponding potential ray paths is just $$N(n,w) = \sum_{k=1}^{k=n} w(w-1)^{k-1} \quad (39)$$

Up to order n, the total number of potential paths, including the direct path, is just this number plus one.

The image generating process described above leads naturally to a tree structure. An illustration is provided in FIG. 8 for the three-walled room 58 and all images up to third order. The actual receiver location 54 appears at the top of the diagram with higher orders of images appearing as successive levels beneath the receiver location 54.

It can be argued that every actual path corresponds to a virtual ray path, i.e. that every time a ray is reflected from a wall, the incident ray is propagating in the direction of an image.

Figure 9:
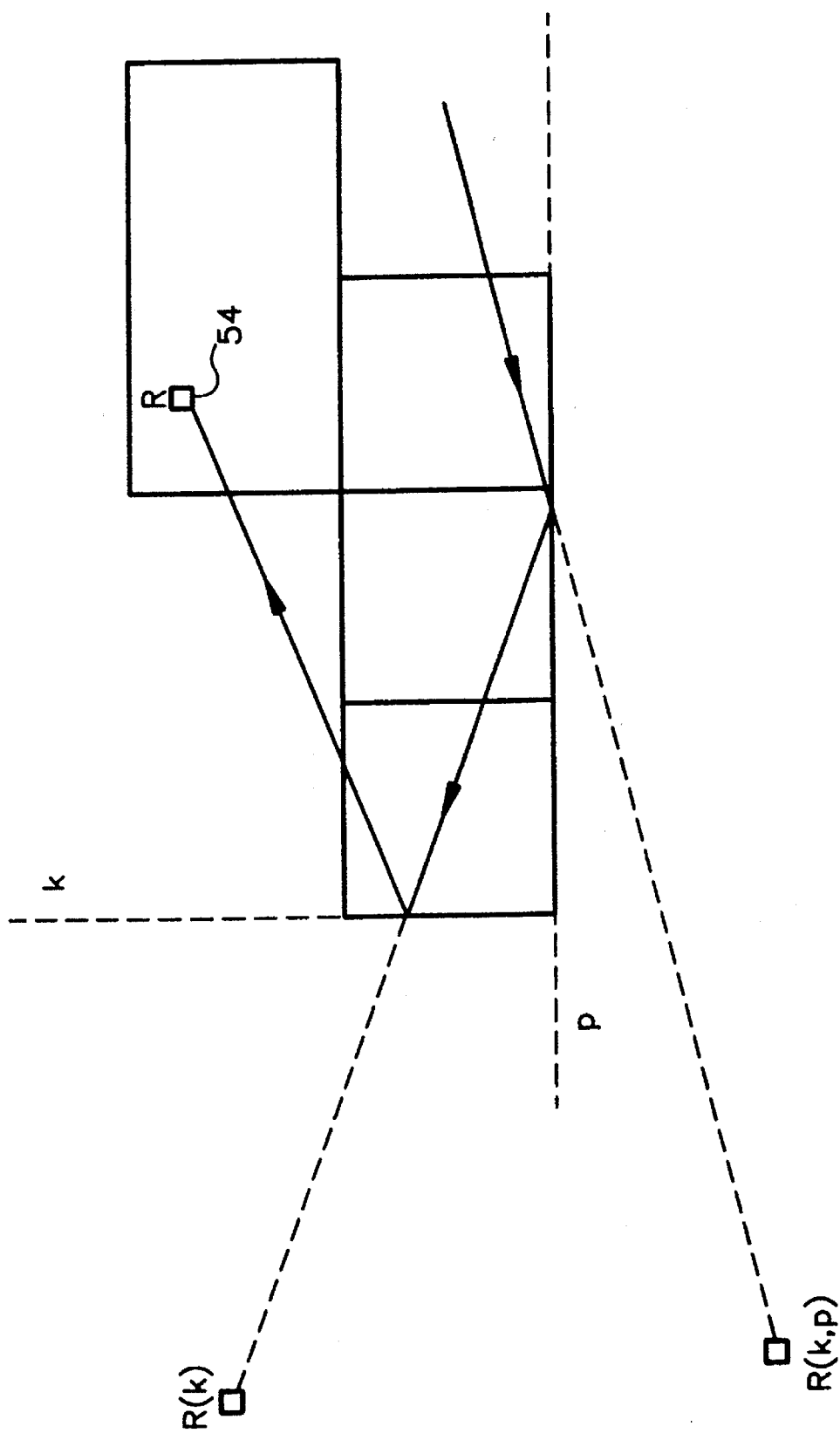
FIG. 9 is a top plan view of a room configuration where a transmitter and receiver are located in different rooms for a discussion relative to the ray tracing model of FIGS. 1 and 2.

For the sake of argument it is best to deal with the most complicated situation, that is, when the transmitter and receiver are located in different (perhaps, widely separated) rooms. Consider a single actual ray path as it arrives at the receiver. Now, this ray is either reflected from one of the walls directly surrounding the receiver or arrives through the wall. Where did it come from? In the first case, the ray that has been bounced from the immediate wall (call it wall-A) arrived at wall-A traveling in the direction of an image of the receiver directly reflected about wall-A. In the second case the ray has either come directly from the transmitter (the trivial case) or has been reflected by some wall (call it wall-B) of some other room. The ray, just before striking wall-B, was headed in the direction of an image of the receiver reflected about wall-B. Thus, we have in either of these cases that the approaching ray is directed at an image reflected about some wall. The following question, very similar to the original question, can now be addressed: where do those approaching rays come from? Clearly, the same answer applies. Those rays either come from the transmitter or are reflected from some wall. If reflected from some wall, the incident ray to that wall must have been propagating in the direction of an image obtained by reflecting the previous image about that wall. This situation is illustrated in FIG. 9, where we track the ray backwards from the receiver to the wall k (receiver image R(k)) and then to wall p (receiver image R(k,p)). The conclusion is clear: every actual ray path corresponds to some sequence of propagation to images. Any actual ray path follows the same general sequence: it leaves the transmitter (perhaps passing through walls) heading in the direction of some distant receiver image, eventually encounters the wall about which the receiver image was reflected, is reflected towards some other receiver image, etc. An important point is the following: at any point along a particular actual ray path, the ray is always headed in the direction of an image, and all the images (up to an initially specified order) are generated using the approach described in this document.

In theory, an infinite number of receiver images could be generated. Instead, we generate images up to a given order. Corresponding to every image, there is a virtual ray path which is a potential actual path. Some of these, because they end up satisfying certain geometric conditions, correspond to actual paths. Every surviving actual path corresponding to an image of order n arrives at the receiver via n reflections from walls of the building. The order n of an image means that the associate image is reflected n times.

An actual ray path to the receiver location 54 is either direct (of which there is only one) or reflected. Since the images of order n are generated in such a way as to include all possible ways that a path can be formed from n reflections off the walls, there is no way that a path involving n reflections can be ignored.

If we use $A_n$ to designate the set of all actual paths that can be formed using n reflections and A to designate that set of all actual paths, we have $$A_0 \cup A_1 \cup A_2 \cup \ldots = A$$

Thus, the totality of ray paths is represented. Similarly, all paths up to a given order are included in $$A_0 \cup A_1 \cup \ldots \cup A_n = A_n$$

Figure 8:
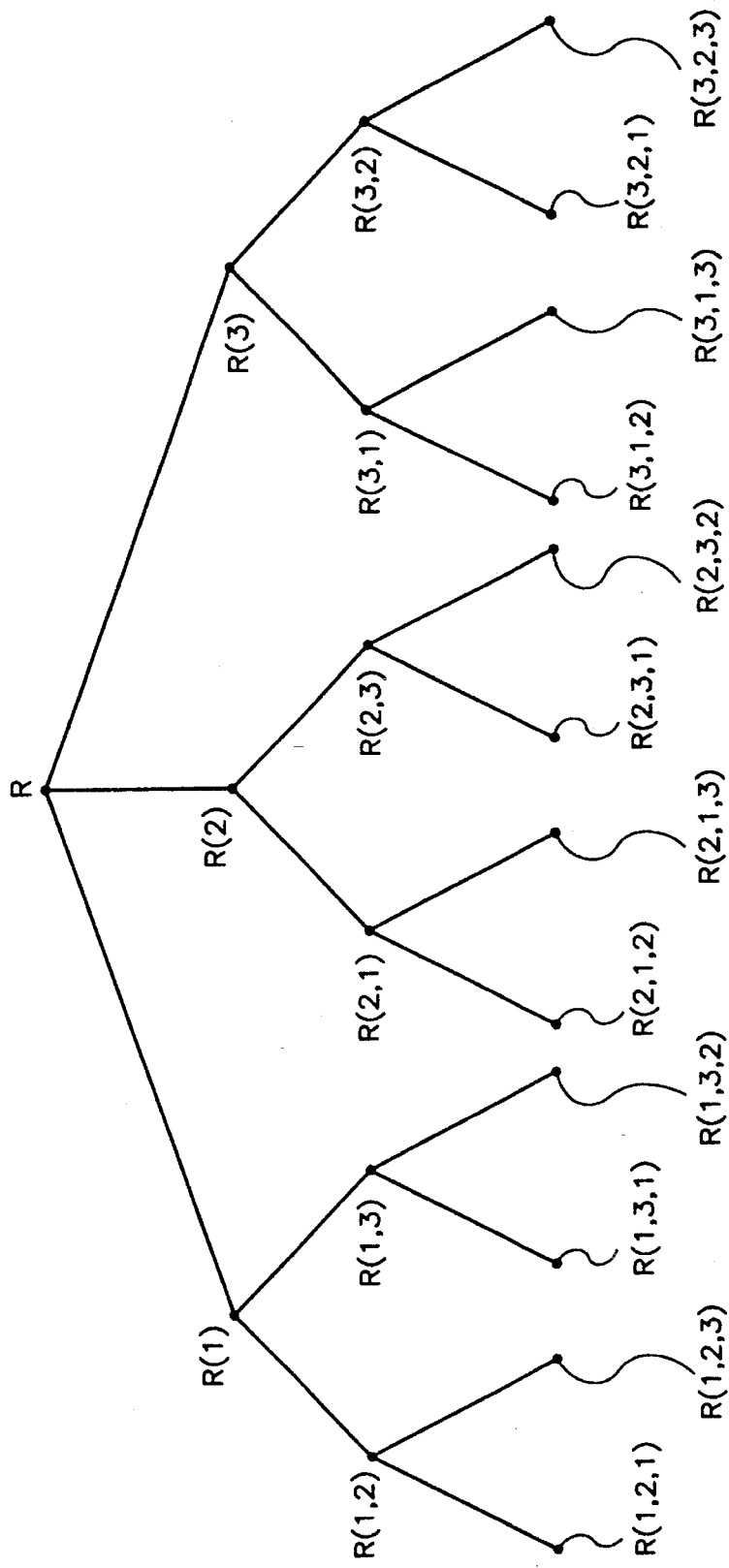
FIG. 8 is a schematic diagram showing tree branching of third order rays for the ray tracing model of the triangular room of FIG. 7.

Returning to the tree of FIG. 8 and using reflections up to order three, FIG. 8 explicitly specifies the potential ray paths that exist for the geometry. The number of images is $3+3 \bullet 2+3 \bullet 2 \bullet 2 = 21$. Subject to the satisfaction of other conditions, each of these images defines a potential ray path, i.e. a potential contributor to the multipath profile. The potential ray path corresponding to each image is found by retracing backwards (up the tree) from that particular image.

The test for wall intersection takes place throughout the effort to determine if a particular transmitter to image path e.g. T to some image $R(\ldots, j,k,l)$ corresponds to an actual path that should be included in the multipath profile.

A wall intersection rule of the ray tracing model will now be described. Consider an image $R(\ldots, j,k)$ is symmetrical with the lower order image $R(\ldots, j)$ about the extended wall k. For a ray emanating from any source point S, the ray from S to $R(\ldots, j,k)$ must intersect the actual wall segment of extended wall k in order for the ray to be reflected towards the image $R(\ldots, j)$. If this intersection doesn't take place the path must be discarded.

Mathematically, the intersection of a ray and a wall is the intersection of two line segments. The ray and the wall are each defined by a beginning and an end point. If the first line segment is defined by the points $(x_{11}, y_{11})$ and $(x_{12}, Y_{12})$, and the second is defined by the points $(x_{21}, y_{21})$ and $(x_{22}, y_{22})$ then the two slopes are $$m_1 = \frac{y_{12} - y_{11}}{x_{12} - x_{11}} \quad m_2 = \frac{y_{22} - y_{21}}{x_{22} - x_{21}} \tag{40}$$

It is helpful to make use of the midpoints $(\bar{x}_1, \bar{y}_1)$ and $(\bar{x}_2, \bar{y}_2)$ of the two line segments. The coordinates are given explicitly by $$\bar{x}_1 = \frac{x_{11} + x_{12}}{2} \quad \bar{y}_1 = \frac{y_{11} + y_{12}}{2} \quad \bar{x}_2 = \frac{x_{21} + x_{22}}{2} \quad \bar{y}_2 = \frac{y_{21} + y_{22}}{2} \tag{41}$$

Corresponding to each of the two segments there are two infinite straight lines $$y = m_1 x + b_1 \quad y = m_2 x + b_2 \tag{42}$$

Applying the first of these to the two end points of the first segment, we have $$y_{11} = m_1 x_{11} + b_1 \quad y_{12} = m_1 x_{12} + b_1 \tag{43}$$

which can be easily solved to obtain $$\bar{y}_1 = m_1 \bar{x}_1 + b_1 \tag{44}$$

A similar equation results from analyzing the second line. From each of these equations expression for the y-axis intercepts follow immediately. We have $$b_1 = \bar{y}_1 - m_1 \bar{x}_1 \quad b_2 = \bar{y}_2 - m_2 \bar{x}_2 \tag{45}$$

On the basis of the developments above, the equations for the straight lines corresponding to the line segments are given by equations (43), (44) and (45).

It is a simple matter to determine that the infinite lines in equation (44) intersect at a point $(x_0, y_0)$ where the coordinates are given by $$x_0 = \frac{b_1 - b_2}{m_2 - m_1} \quad y_0 = \frac{m_2 b_1 - m_1 b_2}{m_2 - m_1} \tag{46}$$

If, as must generally be assumed, the end points of the line segments have not been numbered according to their relative size, we need to define the maximum and minimum of each line segment. We have $$x_1^{min} = \min\{x_{11}, x_{12}\} \quad x_1^{max} = \max\{x_{11}, x_{12}\} \tag{47}$$

$$y_1^{min} = \min\{y_{11}, y_{12}\} \quad y_1^{max} = \max\{y_{11}, y_{12}\}$$

for the first line and $$x_2^{min} = \min\{x_{21}, x_{22}\} \quad x_2^{max} = \max\{x_{21}, x_{22}\} \tag{48}$$

$$y_2^{min} = \min\{y_{21}, y_{22}\} \quad y_2^{max} = \max\{y_{21}, y_{22}\}$$

for the second.

Figure 10:
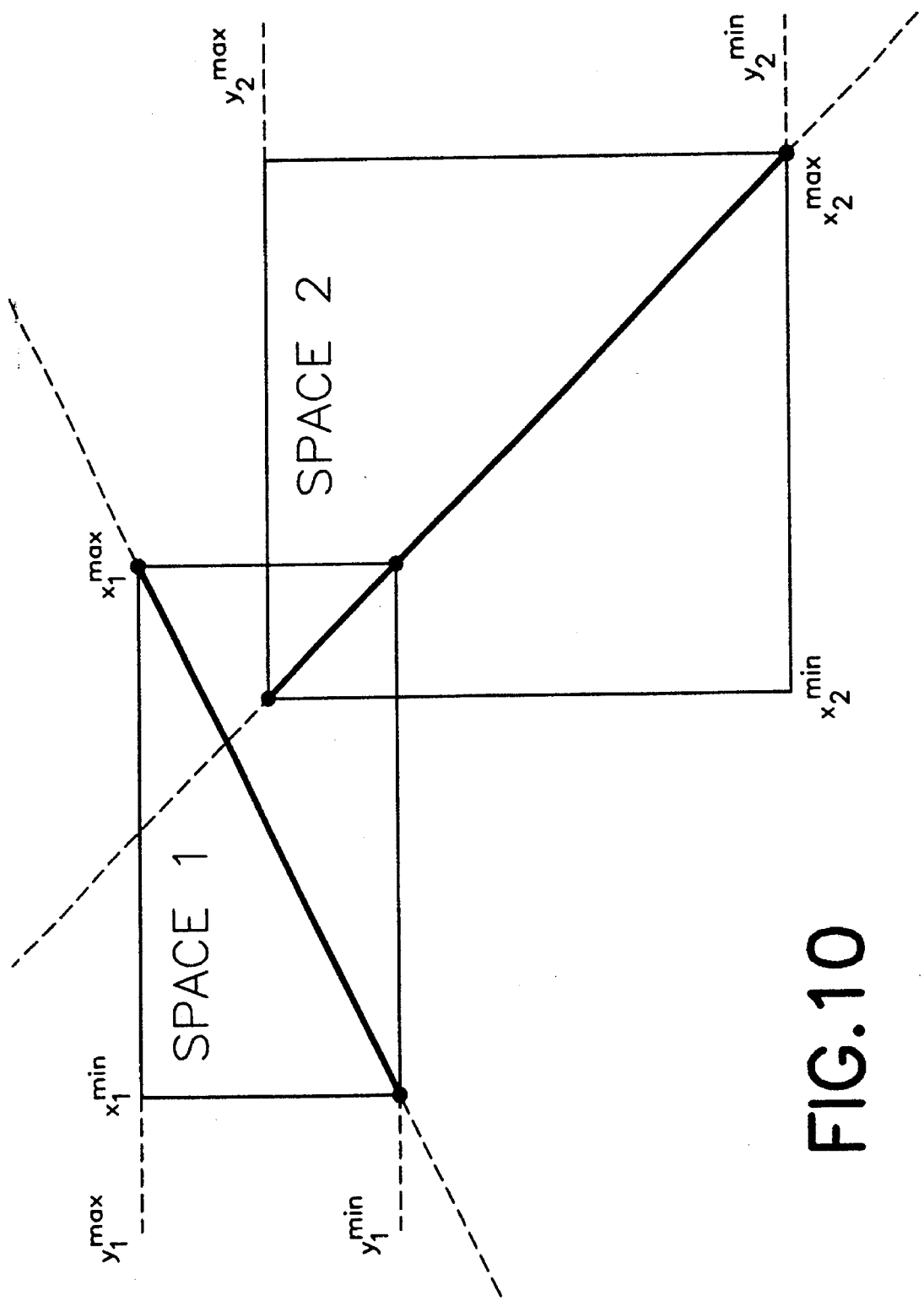
FIG. 10 is a top plan view of line segments for determining when a rate path survives the wall intersection criteria relative to the ray tracing model of FIGS. 1 and 2.

As illustrated in FIG. 10, these upper and lower limits for each of the line segments defines a rectangle within which the coordinates of each line segment must fall. Clearly, the rectangles must overlap if there is to be an intersection of the two line segments. This condition of overlap is something that can be tested for before the point of intersection is actually found. In fact, no intersection will occur if any of the following inequalities is satisfied.

$$x_2^{min} > x_1^{max} \quad x_2^{max} < x_1^{min} \tag{49}$$

$$y_2^{min} > y_1^{max} \quad y_2^{max} < y_1^{min}$$

In computation, this condition should be tested for before actually computing the coordinates of the intersection point.

If none of the inequalities above are satisfied, then the intersection point at $(x_0, y_0)$ must be calculated as given in equation (46). Clearly, this is a circumstance that pertains to FIG. 10, even though the line segments do not themselves intersect. The intersection point of the infinite lines must lie on both line segments in order to qualify as a true intersection point of the segments, i.e. it must fall in both of the rectangles depicted in FIG. 10. Explicitly, it must satisfy all of the inequalities listed below.

$$x_1^{min} < x_0 < x_1^{max} \qquad y_1^{min} < y_0 < y_1^{max} \qquad (50)$$
$$x_2^{min} < x_0 < x_2^{max} \qquad y_2^{min} < y_0 < y_2^{max}$$

If these conditions are satisfied, then the two line segments intersect at the point $(x_0, y_0)$.

When a ray path survives the wall intersection criteria described above it becomes a contributor to the multipath profile, i.e. the channel transfer function. The reflection and transmission coefficient values are determined as described earlier and the total loss, including the free space propagation loss, for each ray path is determined. This yields a complex amplitude $C(n)$ for the ray path. The delay $\tau(n)$ for that same ray path is determined directly from the distance to the corresponding image. When the delays and the complex amplitudes for every ray path up to some order n is determined, the channel transfer function is evaluated according to the sum $$H(f) = \sum_{i=0}^{i=n} C(n) \, e^{-j2\pi(f \cdot f_0)\tau(n)} \qquad (51)$$

It should be emphasized that the foregoing discussion involves a unique ray tracing method in accordance with the present invention, and that numerous other ray tracing techniques can also be practiced for implementing the present invention. For examples of other suitable ray tracing methods, see R. A. Valenzuela "A Ray Tracing Approach to Predicting Indoor Wireless Transmission," 43rd IEEE Vehicular Technology Conference, Secaucus, N.J., U.S.A., pp. 214, May 18-19, 1993, and a compilation text entitled "An Introduction to Ray Tracing," edited by Andrew S. Glassner, Academic Press Limited 1989.

5. Statistical Model

The primary goal of the statistical model 28 is to make rapid approximate calculations that are still precise enough to be of use in system design and base station layout. Initially, a data base is compiled of propagation law expressions which are best fits to either experimental data or to results obtained by running the ray tracing model 27. The propagation law expressions are essentially a scaling coefficient A with a corresponding exponent n. Each of the propagation laws {A, n} is derived from the interior space of a particular floor plan, conductivity and permittivity values of the walls of that interior space, and the locations of the transmitter and receiver within the walls. The data base is preferably arranged in the form of a look up table so that particular propagation laws {A, n} can be looked up, given a particular floor plan, corresponding conductivity and permittivity of walls, and corresponding locations of the transmitter and receiver.

Figure 11:
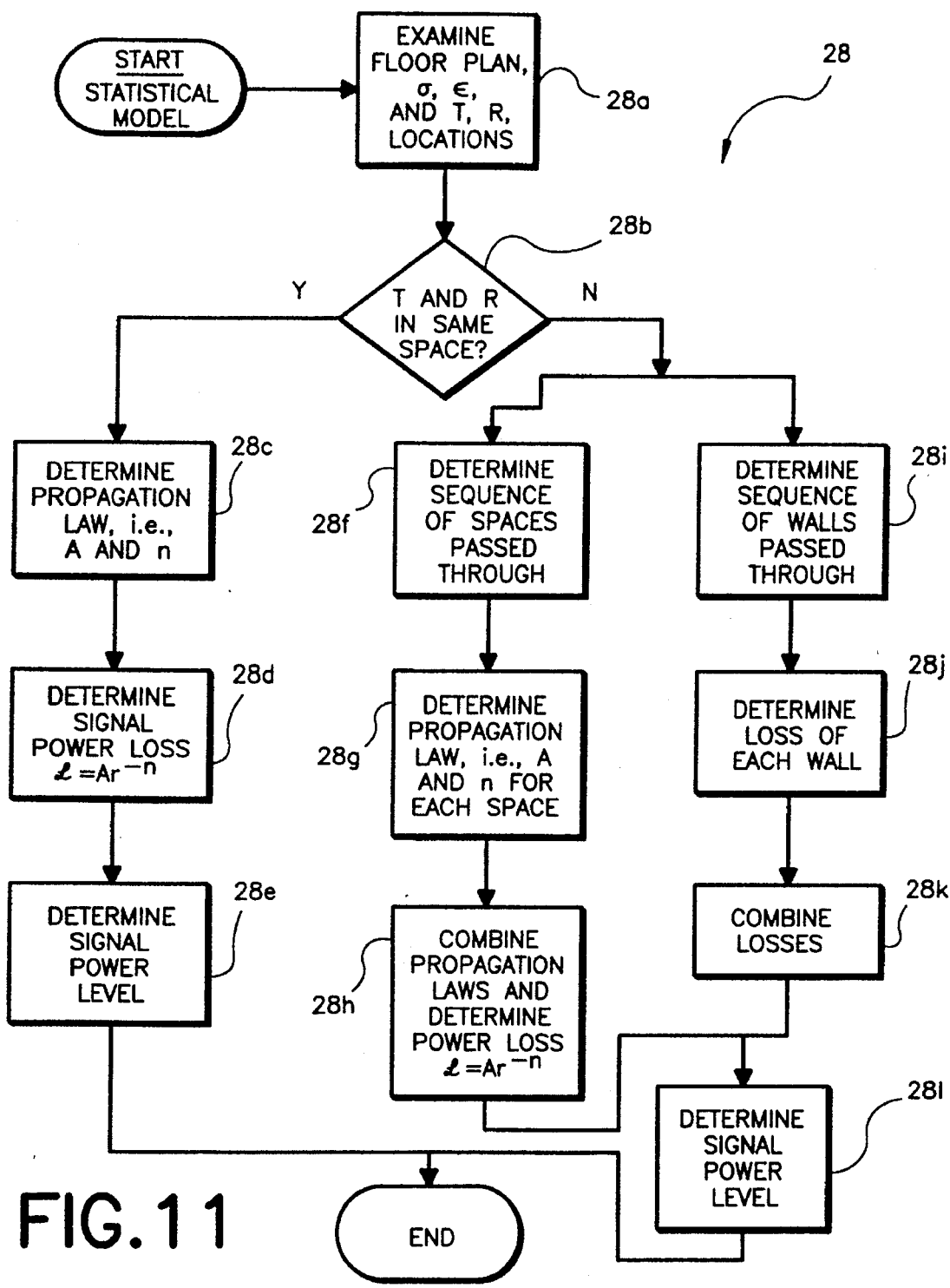
FIG. 11 is a flow chart illustrating the statistical model of FIGS. 1 and 2.

The analysis engine 14 (FIG. 1) uses the look up table as will be described in FIG. 11, which shows a high level flow chart of the statistical model. Each of the flow chart blocks represents a software module and/or subroutine in the preferred embodiment. Referring to FIG. 11, as indicated in a flow chart block 28a, the inputs to the CET 10 are examined by the analysis engine 14. The inputs are the floor plan, conductivity and permittivity of the walls, and the location of the transmitter and receiver within the floor plan. From the inputs, a determination is made as to whether the transmitter and receiver locations 34, 35 are in the same space, or room.

If the transmitter and receiver locations 34, 35 are in the same space, then the methodology proceeds to flow chart blocks 28c–28e. At the flow chart block 28c, the propagation law {A, n} are determined by looking them up in the look up table using the floor plan, conductivity, permittivity, and the transmitter and receiver locations. Once the appropriate propagation law {A, n} has been identified, then the signal power loss $\mathcal{L}$ is computed by the equation $\mathcal{L}=Ar^{-n}=A/r^n$). See flow chart block 28d. Finally, the RMS signal power level may be determined by subtracting the signal power loss $\mathcal{L}$ from the signal power corresponding to the transmitter, as indicated in the flow chart block 28e.

Figure 12:
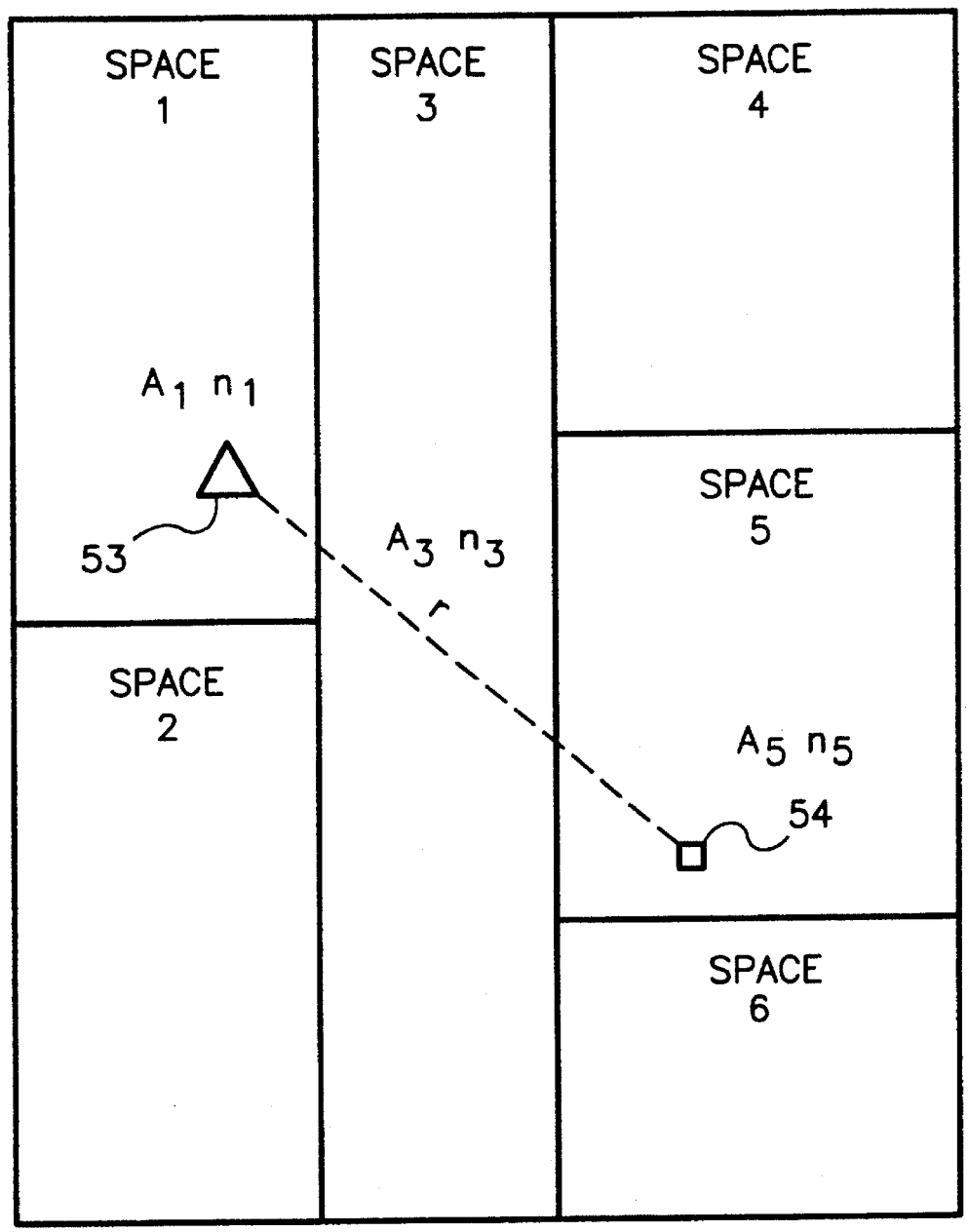
FIG. 12 is a top plan view of a room configuration wherein power loss of rooms are combined using the statistical model of FIG. 11.

If the transmitter and receiver locations 34, 35 are not in the same space, then the methodology proceeds to flow chart blocks 28f–28l. An example of this scenario is shown in FIG. 12, which example will be referred to hereafter relative to the discussion of the flow chart blocks. First, as indicated in a flow chart block 28f, the sequence of spaces which the propagation channel passes through is determined. As illustrated in FIG. 12, the exemplary propagation channel passes through spaces 1, 3, 5. Next, the propagation laws $\{A_i, n_i\}$ are determined for each of the i spaces in which the propagation channel passes. In the example of FIG. 12, the propagation laws $\{A_1, n_1\}$, $\{A_3, n_3\}$, $\{A_5, n_5\}$ are identified for each of the corresponding spaces 1, 3, 5 using the look up table. The propagation laws $\{A_1, n_1\}$, $\{A_3, n_3\}$, $\{A_5, n_5\}$ are then combined to derive a resultant A and a resultant n. The coefficients $A_1, A_3, A_5$, and the exponent $n_1, n_3, n_5$ are then mathematically combined.

This is allowed because the fundamental power law $$P(r)=Ar^{-n} \qquad (52)$$

can be modified to $$P(r) = \left(\frac{r_1}{r}\right)^n P(r_1) \quad r > r_i \qquad (53)$$

which represents the power at an arbirary r in terms of the power at a specific $r_1$. Specifically, the signal power level in one interior space [where propagation law $(A_1, n_1)$ applies] can be represented in terms of the power level of the signal transmitted through a wall from an adjacent interior space [where propagation law $(A_2, n_2)$ applies]. In fact, if the wall loss is designated $\alpha$ and the point at $r_1$ is just forward of the exit point from the wall in space 2, then the propagation loss in propagating from space 1 to space 2 is given by $$P_{S_1-S_2}(r)=(\alpha A_1 r_1^{n_2-n_1}) r^{-n_2} \qquad (54)$$

This is in the same form as the general law $Ar^{-n}$, in fact defining A and r. In exactly analogous fashion the signal loss in situations with an arbitrary number of intervening walls can be determined. In every case the final signal power loss $\mathcal{L}$ is computed using the resultant n, and the distance r between the transmitter location 53 and receiver location 54.

Concurrently with the process described previously in flow chart blocks 28f–28h, the wall losses are analyzed as indicated in successive flow chart blocks 28i–28k. As indicated in the flow chart block 28i, a determination is made as to the sequence of walls in which the propagation channel passes. After the walls have been identified, a signal loss is determined for each wall based upon the respective conductivity and permittivity of each wall. See flow chart block 28j.

The wall losses are combined to form a resultant signal loss which is used in connection with the signal power loss—when determining the RMS signal power level, as indicated at the flow chart block 281. In essence, the RMS signal power level at the receiver location 34 is determined by subtracting the signal losses from a signal power level at the transmitter location 33.

It should be noted that for particular space configurations, such as corridors, rooms, or corners, the coefficient A and the exponent n in the propagation law may also be determined by scaling experimentally-determined values for A and n for similar space configurations.

Referring to a rectangular room of width W and length L, within which the locations of the transmitter and receiver are at $(x_T, y_T)$ and $(x_R, y_R)$ respectively (as shown in FIG. 5), the transfer function in this room can be directly related to the transfer function in a room in which all of these dimensions have been scaled by a factor $\alpha$.

The scaling is as follows: if f is the offset frequency relative to the center frequency $f_0$ and the transfer function in the original room is designated $H(f+f_0)$, then the new transfer function after scaling is given by $$\frac{1}{a} H(a(f+f_0)) \tag{55}$$

The averaging process used to obtain the RMS values is not much affected by the scaling of the frequency argument. Thus, using OMS to denote the original mean squared value of the transfer function (before scaling) and NMS to denote the new value, we have $$NMS \approx \frac{1}{a^2} OMS \tag{56}$$

as an excellent approximation to the new mean-squared value of the transfer function.

It will be obvious to those skilled in the art that many modifications may be made to the preferred embodiment of the present invention without substantially departing from the principles of the present invention. All such modifications are intended to be included herein within the scope of the present invention, as set forth in the following claims.

Wherefore, the following is claimed:

1. A computer-based machine for determining wireless communications transfer characteristics between a transmitter location and a receiver location within and around an architectural structure based upon a floor plan of said architectural structure, material parameter and said transmitter and receiver locations, comprising:

means for receiving inputs;

means for determining from said inputs said floor plan of said architectural structure, said transmitter location and said receiver location within said floor plan, and respective relative permittivity and conductivity values of walls within said floor plan;

means for determining said transfer characteristics for a communications channel between said transmitter and receiver locations by mathematically combining said transmitter location, said receiver location, said relative permittivity values, and said conductivity values; and means for displaying said transfer function.

2. A computer-based cellular engineering tool for determining wireless communications transfer characteristics between a transmitter location and receiver location within and around an architectural structure from architectural data, wall material parameters, and said transmitter and receiver locations, comprising:

user interface means for receiving input data and for displaying said transfer characteristics;

means for determining from said inputs a floor plan, said transmitter location and said receiver location within said floor plan, with respect to relative permittivity and conductivity values of walls within said floor plan; and analysis means for determining a transfer characteristic for a communication channel between said transmitter and receiver locations by mathematically combining said transmitter location, said receiver location, said relative permittivity values and said conductivity values; and means for graphically displaying said transfer characteristic.

\* \* \* \* \*